UNITED STATES PATENT OFFICE

2,626,260
NITROBENZISOXAZOLES

Raymond O. Clinton, North Greenbush, and Stanley C. Laskowski, Menands, N. Y., assignors to Sterling Drug Inc., New York, N. Y., a corporation of Delaware No Drawing. Application September 5, 1951, Serial No. 245,245

22 Claims. (Cl. 260—294.3)

This invention relates to tertiary-aminoalkyl esters and amides of 6-nitrobenzisoxazole-3-carboxylic acid and to their preparation.

The compounds of our invention have the general formula

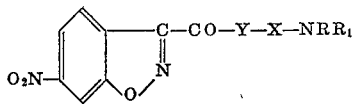

where Y is O or NH, X is a lower alkylene radical and $NRR_1$ is a tertiary-amino radical. These compounds are useful as intermediates in the preparation of other organic compounds. The esters (where Y is O), for example, undergo a novel rearrangement reaction to form 4-nitro-2-(tertiary-aminoalkoxy)benzonitriles. This rearrangement process is disclosed and claimed in our copending application Serial No. 245,250, filed September 5, 1951. The 4-nitro-2-(tertiary-aminoalkoxy)benzonitriles are disclosed and claimed in our copending application Serial No. 245,243, filed September 5, 1951.

In the above general formula, the lower alkylene radical designated as X has preferably two to four carbon atoms and has its two free valence bonds on different carbon atoms. Thus, X includes such examples as

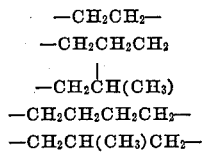

and the like. The tertiary-amino radical shown above as $NRR_1$ comprehends dialkylamino radicals where R and $R_1$ are lower alkyl groups, alike or different, and each alkyl group having one to six carbon atoms, such dialkylamino radicals including dimethylamino, diethylamino, ethylmethylamino, diisopropylamino, ethyl-n-propylamino, di-n-butylamino, di-n-hexylamino, and the like. Further, the tertiary-amino radical designated as $NRR_1$ encompasses saturated N-heteromono-cyclic radicals having five to six ring atoms, illustrated by examples such as 1-piperidyl; (lower alkylated)-1-piperidyl such as 2-methyl-1-piperidyl, 3-ethyl-1-piperidyl, 4-methyl-1-piperidyl, 2,6-dimethyl-1-piperidyl; 1-pyrrolidyl; (lower alkylated)-1-pyrrolidyl such as 2-methyl-1-pyrrolidyl, 2,5-dimethyl-1-pyrrolidyl; 4-morpholinyl; and the like.

The compounds of our invention are prepared by reacting a lower alkyl 6-nitrobenzisoxazole-3-carboxylate with a compound having the formula $H-Y-X-NRR_1$, where Y, X and $NRR_1$ have the meanings given hereinabove. The reaction is carried out preferably using methyl 6-nitrobenzisoxazole-3-carboxylate because of its ease of preparation. Where Y is O, that is, where $H-Y-X-NRR_1$ is a tertiary-aminoalkanol, the resulting product is a tertiary-aminoalkyl 6-nitrobenzisoxazole-3-carboxylate; where Y is NH, that is, where $H-Y-X-NRR_1$ is a tertiary-aminoalkylamine, the resulting product is an N-(tertiary-aminoalkyl)-6-nitrobenzisoxazole-3-carboxamide. The reaction is carried out preferably by heating a mixture of methyl 6-nitrobenzisoxazole-3-carboxylate and a tertiary-aminoalkanol or a tertiary-aminoalkylamine. Illustrative of the reaction is the formation of 2-diethylaminoethyl 6-nitrobenzisoxazole-3-carboxylate and N-(2-diethylaminoethyl)-6-nitrobenzisoxazole-3-carboxamide by heating methyl 6-nitrobenzisoxazole-3-carboxylate with 2-diethylaminoethanol and 2-diethylaminoethylamine, respectively. The reaction is carried out preferably using a non-polar inert solvent, such as benzene, toluene, xylene, a petroleum ether fraction, etc. Best yields of the tertiary-aminoalkyl 6-nitrobenzisoxazole-3-carboxylates were obtained when a heating period of about thirty minutes was used and when the methanol formed by the reaction was removed from the reaction mixture by distillation. While these conditions are desirable for obtaining best yields of said esters, the reaction can be carried out without using them, but with a sacrifice in yield of the esters. A prolonged heating period is undesirable since this would result in rearrangement of the tertiary-amino 6-nitrobenzisoxazole-3-carboxylates to produce the related 4-nitro-2-(tertiary-aminoalkoxy)benzonitriles, this rearrangement process having been referred to hereinabove.

The tertiary-aminoalkyl 6-nitrobenzisoxazole-3-carboxylates are relatively unstable in their free base form even when simply exposed to air at room temperature; even under these mild conditions they tend to slowly undergo said rearrangement reaction to give small quantities of the resulting 4-nitro-2-(tertiary-aminoalkoxy)-benzonitriles. However, these esters, in the form of their acid addition salts, are quite stable. Therefore, in practicing our invention, we prefer to isolate the tertiary-aminoalkyl 6-nitrobenzisoxazole-3-carboxylates in the form of their hydrochloride addition salts.

The N-(tertiary-aminoalkyl)-6-nitrobenzisoxazole-3-carboxamides of our invention are very stable whether in the form of their free bases or as their acid addition salts.

Our invention comprehends the tertiary-aminoalkyl esters and amides of 6-nitrobenzisoxazole-3-carboxylic acid whether in the form of their free bases or in the form of their salts with relatively non-toxic organic or inorganic acids. In practicing our invention, we found it convenient to isolate our compounds in the form of their hydrochlorides. However, other acid addition salts are within the scope of our invention. Such additional salts including the hydrobromides, sulfates, phosphates, citrates, sulfamates, tartrates, succinates, acetates, benzoates, oleates, and the like.

Specific embodiments of our invention are illustrated by the following examples.

I. Lower alkyl 6-nitrobenzisoxazole-3-carboxylates

Methyl 6-nitrobenzisoxazole-3-carboxylate was prepared from methyl 2,4-dinitrophenylacetate according to the method of Borsche [Ann. 390, 1 (1912)]. In order to achieve consistently the yield of 85% reported by Borsche, it was found necessary to use freshly prepared butyl nitrite and an initial mixing temperature of 40° C. for the components. This ring closure procedure was also tried using other lower alkyl esters of 2,4-dinitrophenylacetic acid; however, with poor results. Using n-propyl, isopropyl and n-butyl esters of 2,4-dinitrophenylacetic acid, in their respective alkanols as solvents, only tarry products were obtained. Using ethyl 2,4-dinitrophenylacetate in ethanol, a yield of about 20% of ethyl 6-nitrobenzisoxazole-3-carboxylate was obtained. This ester recrystallized as yellow needles from ethanol, M. P. 99.0–100.0° C. (cor.).

Anal. Calcd. for
$C_{10}H_8N_2O_5$ ---- C, 51.07; H, 3.43; $N_{NO_2}$, 5.91; $N_D$, 11.91
Found ---- C, 51.07; H, 3.35; $N_{NO_2}$, 6.04; $N_D$, 12.15

$N_{NO_2}$ stands for nitro nitrogen as determined by titration with standard titanous chloride in glacial acetic acid solution.
$N_D$ stands for total nitrogen as determined by the Dumas method.

A better method for preparing the lower alkyl 6-nitrobenzisoxazole-3-carboxylates other than the methyl ester is afforded by the ester exchange reaction of methyl 6-nitrobenzisoxazole-3-carboxylate and the appropriate lower alkanol, as illustrated in the following preparation of ethyl 6-nitrobenzisoxazole-3-carboxylate using ethanol. A mixture of 40 g. of methyl 6-nitrobenzisoxazole-3-carboxylate, 300 ml. of anhydrous ethanol and 2 ml. of triethylamine was boiled gently for twenty minutes. The clear solution was diluted while hot with an equal volume of water, cooled, filtered and the product was washed with water. The resulting material, after drying, was again treated with anhydrous ethanol and triethylamine as before. There was thus obtained a nearly quantitative yield of ethyl 6-nitrobenzisoxazole-3-carboxylate, M. P. 99.0–100.0° C.

Following this procedure but using other lower alkanols in place of ethanol, the corresponding lower alkyl 6-nitrobenzisoxazole-3-carboxylates are formed. Thus, using n-propanol, n-butanol or isobutanol there is obtained, respectively, n-propyl 6-nitrobenzisoxazole-3-carboxylate, n-butyl 6-nitrobenzisoxazole-3-carboxylate or isobutyl 6-nitrobenzisoxazole-3-carboxylate.

II. Tertiary-aminoalkyl 6-nitrobenzisoxazole-3-carboxylates

Preparation of these esters, in the form of their hydrochlorides, is illustrated by the following general procedure. A mixture of 44.4 g. (0.2 mole) of methyl 6-nitrobenzisoxazole-3-carboxylate, 0.22 mole of the appropriate tertiary-aminoalkanol and 350 ml. of dry toluene was distilled slowly through a 14″ vacuum-jacketed Vigreux column surmounted by a total-reflux variable take-off distillation head. During one-half hour twelve to sixteen ml. of distillate were collected, the final distillate temperature being 105° C. The pale yellow-brown still residue was decolorized using decolorizing charcoal and the toluene was removed in vacuo. The residue was dissolved in ethyl acetate and the solution was treated with an excess of 20% ethereal hydrogen chloride. The precipitated white solid was recrystallized from ethanol or isopropanol. The yields of the purified tertiary-aminoalkyl 6-nitrobenzisoxazole-3-carboxylates in the form of their hydrochlorides were 65–75%.

The same products result when the above procedure is followed but using other alkyl esters such as ethyl or n-butyl 6-nitrobenzisoxazole-3-carboxylate in place of methyl 6-nitrobenzisoxazole-3-carboxylate.

When the above procedure was followed using 2-diethylaminoethanol as the tertiary-aminoalkanol, the resulting product was 2-diethylaminoethyl 6-nitrobenzisoxazole-3-carboxylate as the hydrochloride. Use of other tertiary-aminoalkanols yield the corresponding tertiary-aminoalkyl esters in the form of their hydrochlorides as given in Table A below.

The free base form of a given ester was conveniently prepared by dissolving a portion of the hydrochloride salt in ice water and treating the solution with an excess of cooled, saturated sodium bicarbonate solution. The precipitated oily or crystalline base was taken up in cold ethyl acetate, the extract was dried and the tertiary-aminoalkyl 6-nitrobenzisoxazole-3-carboxylate was obtained by removing the ethyl acetate in vacuo.

TABLE A

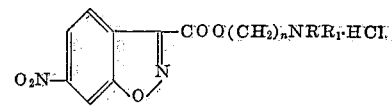

| n | $NRR_1$ | M. P., ° C. (corr.) | Formula | Analyses | | | |
|---|---------|---------------------|---------|----------|--|--|--|
|   |         |                     |         | Cl | | $N_{NO_2}$ | |
|   |         |                     |         | Calcd. | Found | Calcd. | Found |
| 2 | $N(CH_3)_2$ | a 172.0–173.0 | $C_{12}H_{13}N_3O_5 \cdot HCl$ | 11.23 | 11.22 | (b) | (b) |
| 2 | $N(C_2H_5)_2$ | a 151.8–153.0 | $C_{14}H_{17}N_3O_5 \cdot HCl$ | 10.31 | 10.32 | 4.07 | 4.04 |
| 3 | $N(C_2H_5)_2$ | 151.5–151.8 | $C_{15}H_{19}N_3O_5 \cdot HCl$ | 9.91 | 9.97 | 3.92 | 3.99 |
| 2 | $NC_5H_{10}$ c | a 160.1–161.0 | $C_{15}H_{17}N_3O_5 \cdot HCl$ | 9.97 | 10.02 | 3.94 | 3.84 |
| 2 | $NC_6H_{12}$ d | a 151.0–151.5 | $C_{16}H_{19}N_3O_5 \cdot HCl$ | 9.59 | 9.69 | 3.79 | 3.74 |
| 3 | $NC_5H_{10}$ c | 189.9–190.3 | $C_{16}H_{19}N_3O_5 \cdot HCl$ | 9.59 | 9.44 | 3.79 | 3.70 |
| 3 | $NC_6H_{12}$ d | 157.8–158.7 | $C_{17}H_{21}N_3O_5 \cdot HCl$ | 9.24 | 9.20 | 3.65 | 3.63 | a With decomposition.
b Calcd.: C, 45.65; H, 4.47. Found: C, 45.74; H, 4.75.
c $NC_5H_{10}$ = 1-piperidyl.
d $NC_6H_{12}$ = 2-methyl-1-piperidyl.

Additional tertiary-aminoalkyl 6-nitrobenzisoxazole-3-carboxylates, in the form of their hydrochloride addition salts, which can be prepared according to the foregoing procedure include the following: 3-(2,6-dimethyl-1-piperidyl)propyl 6-nitrobenzisoxazole-3-carboxylate; 3-(4-morpholinyl)propyl 6-nitrobenzisoxazole-3-carboxylate; 3-(1-pyrrolidyl)propyl 6-nitrobenzisoxazole - 3-carboxylate; 2-(2,5-dimethyl-1 - pyrrolidyl)ethyl 6-nitrobenzisoxazole-3-carboxylate; 4-dimethylaminobutyl 6-nitrobenzisoxazole-3-carboxylate; 3-dimethylamino-2-propyl 6 - nitrobenzisoxazole - 3 - carboxylate; 2-(di-n-butylamino)ethyl 6 - nitrobenzisoxazole - 3 - carboxylate; 2-(3-ethyl-1-piperidyl)ethyl 6-nitrobenzisoxazole - 3 - carboxylate; 3-(4-methyl-1-piperidyl)propyl 6 - nitrobenzisoxazole - 3 - carboxylate; 3-(2-methyl-1-pyrrolidyl)propyl 6-nitrobenzisoxazole-3-carboxylate; and the like.

III. N - (tertiary-aminoalkyl) -6-nitrobenzisoxazole-3-carboxamides

Preparation of these amides is illustrated by the following general preparation. A mixture of 44.4 g. (0.20 mole) of methyl 6-nitrobenzisoxazole-3-carboxylate, 0.3 mole of a tertiary-aminoalkylamine and 300 ml. of toluene was refluxed for about five to nine hours. The toluene was removed in vacuo and the residual crystalline product was washed thoroughly with n-pentane. The insoluble residue was dissolved in ethyl acetate, the solution was decolorized using decolorizing charcoal, and there was added to the filtrate an excess of 20% ethereal hydrogen chloride. The resulting crystalline hydrochloride was recrystallized from ethanol. The yields of the purified hydrochlorides varied from 70-85%. The hydrochlorides were converted to the base using aqueous potassium carbonate solution, and the resulting N-(tertiary-aminoalkyl)-6-nitrobenzisoxazole - 3-carboxamides were recrystallized from n-heptane.

The same products are obtained when the above procedure is followed but using other alkyl esters such as ethyl or n-butyl 6-nitrobenzisoxazole-3-carboxylate in place of methyl 6-nitrobenzisoxazole-3-carboxylate.

When the above procedure was followed using, as the tertiary-aminoalkylamine, 2-diethylaminoethylamine, 3-diethylaminopropylamine, 4-diethylaminobutylamine and 3-diethylamino-2-hydroxypropylamine, the resulting products were, respectively, N-(2-diethylaminoethyl)-6-nitrobenzisoxazole - 3 - carboxamide hydrochloride, M. P. 227.0–228.5° C. (cor.) [Anal. Calcd. for $C_{14}H_{18}N_4O_4 \cdot HCl$: $N_{NO_2}$, 4.09; Cl, 10.34. Found: $N_{NO_2}$, 4.32; Cl, 10.44]; N-(3-diethylaminopropyl)-6-nitrobenzisoxazole-3-carboxamide hydrochloride, M. P. 232.5–233.5° C. with decomposition (cor.) [Anal. Calcd. for $C_{15}H_{20}N_4O_4 \cdot HCl$: $N_D$, 15.70; Cl, 9.94. Found: $N_D$, 15.44; Cl, 9.90]; N - (4-diethylaminobutyl)-6-nitrobenzisoxazole-3-carboxamide hydrochloride, M. P. 173.0–174.8° C. (cor.) [Anal. Calcd. for $C_{16}H_{22}N_4O_4 \cdot HCl$: $N_{NO_2}$, 3.78; Cl, 9.56. Found: $N_{NO_2}$, 3.64; Cl, 9.50]; and N - (3 - diethylamino-2-hydroxypropyl)-6-nitrobenzisoxazole - 3 - carboxamide hydrochloride, M. P. 209.0–209.7° C. (cor.) [Anal. Calcd. for $C_{15}H_{20}N_4O_5 \cdot HCl$: $N_{NO_2}$, 3.76; Cl, 9.51. Found: $N_{NO_2}$, 3.98; Cl, 9.66].

Treatment of the foregoing N-(tertiary-aminoalkyl)-6-nitrobenzisoxazole-3-carboxamide hydrochlorides with aqueous potassium carbonate solution, as described above, yielded the following respective N-(tertiary-aminoalkyl)-6-nitrobenzisoxazole-3-carboxamides in their free base form: N - (2-diethyl-aminoethyl)-6-nitrobenzisoxazole-3-carboxamide, M. P. 61.0–63.0° C. (cor.) [Anal. Calcd. for $C_{14}H_{18}N_4O_4$: $N_{BA}$, 4.57. Found: $N_{BA}$, 4.58]; N-(3-diethylaminopropyl)-6-nitrobenzisoxazole-3-carboxamide, M. P. 89.0–89.5° C. (cor.) [Anal. Calcd. for $C_{15}H_{20}N_4O_4$: $N_{BA}$, 4.37; $N_{NO_2}$, 4.37. Found: $N_{BA}$, 4.36; $N_{NO_2}$, 4.14]; N-(4-diethylaminobutyl) - 6-nitrobenzisoxazole-3-carboxamide, M. P. 59.0–60.0° C. (cor.) [Anal. Calcd. for $C_{16}H_{22}N_4O_4$: C, 57.47; H, 6.63; $N_{BA}$, 4.19. Found: C, 57.54; H, 6.58; $N_{BA}$, 4.14]; and N-(3-diethylamino-2-hydroxypropyl)-6-nitrobenzisoxazole-3-carboxamide, M. P. 119.8–120.7° C. (cor.) [Anal. Calcd. for $C_{15}H_{20}N_4O_5$: $N_{BA}$, 4.16. Found: $N_{BA}$, 4.18].

$N_{BA}$ stands for basic amino nitrogen as determined by titration with perchloric acid in glacial acetic acid solution.

Additional (tertiary - aminoalkyl) - 6 - nitrobenzisoxazole-3-carboxamides which can be prepared according to the foregoing procedure using the appropriate tertiary-aminoalkylamine include the following: N-[3-(2,6-dimethyl-1-piperidyl)propyl] - 6 - nitrobenzisoxabole - 3 - carboxamide; N-[3-(4 - morpholinyl)propyl]-6 - nitrobenzisoxazole - 3 - carboxamide; N-[3 - (1 - pyrrolidyl)propyl] - 6 - nitrobenzisoxazole - 3 - carboxamide; N-[2-(2,5 - dimethyl - 1 - pyrrolidyl)ethyl] - 6 - nitrobenzisoxazole-3 - carboxamide; N - (4 - dimethylaminobutyl) - 6 - nitrobenzisoxazole - 3 - carboxamide; N-(3-dimethylamino - 2 - propyl) - 6 - nitrobensisoxazole - 3 - carboxamide; N - [2 - (di - n - butylamino)ethyl] - 6 - nitrobenzisoxazole - 3 - carboxamide; N - [2 - (3 - ethyl - 1 - piperidyl)-ethyl] - 6 - nitrobenzisoxazole - 3 - carboxamide; N - [3 - (4 - methyl - 1 - piperidyl)propyl] - 6 - nitrobenzisoxazole - 3 -carboxamides; N - [3 - (2 - methyl - 1 - pyrrolidyl)propyl] - 6 - nitrobenzisoxazole - 3 - carboxamide; and the like.

Our N-(tertiary-aminoalkyl)-6-nitrobenzisoxazole-3-carboxamides can be converted into their quaternary ammonium salts as illustrated by the following examples: A mixture of 5 g. of N - (3 - diethylaminopropyl) - 6 - nitrobenzisoxazole-3-carboxamide, 20 ml. of methyl iodide, 50 ml. of ethyl acetate and 25 ml. of absolute ethanol was refluxed for one and three-quarter hours. The reaction mixture was cooled and the precipitated product was collected and washed well with ethyl acetate. Two recrystallizations of this precipitate from 95% ethanol yielded, as a white crystalline product, N-(3-diethylaminopropyl) - 6 - nitrobenzisoxazole - 3 - carboxamide methiodide, M. P. 204.0–206.0° C. (cor.) when dried over phosphorus pentoxide at 100° C. and 0.01 mm. for four hours.

Anal. Calcd. for $C_{15}H_{20}N_4O_4 \cdot CH_3I$: $N_{NO_2}$, 3.03; I, 27.46. Found: $N_{NO_2}$, 3.21; I, 27.19.

Following the foregoing procedure but using N - (3 - diethylamino - 2 - hydroxypropyl) - 6 - nitrobenzisoxazole - 3 - carboxamide instead of N - (3 - diethylaminopropyl) - 6 - nitrobenzisoxazole-3-carboxamide, there was obtained N-(3 - diethylamino - 2 - hydroxypropyl) - 6 - nitrobenzisoxazole - 3 - carboxamide methiodide, M. P. 174.5–175.8° C. (cor.).

Anal. Calcd. for $C_{15}H_{20}N_4O_5 \cdot CH_3I$: $N_{NO_2}$, 2.93; I, 26.54. Found: $N_{NO_2}$, 2.88; I, 26.40.

We claim:
1. A compound having the formula

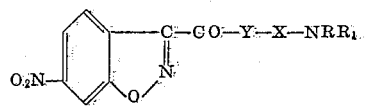

where Y is a member of the group consisting of O and NH, X is a lower alkylene radical whose two free valence bonds are on different carbon atoms and $NRR_1$ is a tertiary-amino radical selected from the group consisting of lower dialkylamino, 1-piperidyl, (lower alkylated)-1-piperidyl, 1-pyrrolidyl, (lower alkylated)-1-pyrrolidyl and 4-morpholinyl.

2. An ester having the formula

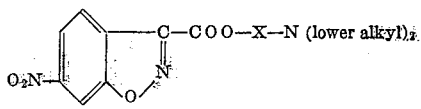

where X is a lower alkylene radical whose two free valence bonds are on different carbon atoms.

3. An ester having the formula

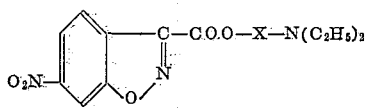

where X is a lower alkylene radical whose two free valence bonds are on different carbon atoms.

4. An ester having the formula

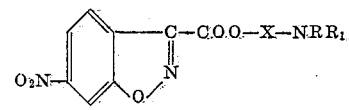

where X is a lower alkylene radical whose two free valence bonds are on different carbon atoms and $NRR_1$ is a (lower alkylated)-1-piperidyl radical.

5. An ester having the formula

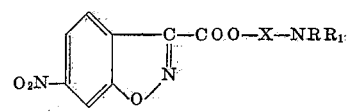

where X is a lower alkylene radical whose two free valence bonds are on different carbon atoms and $NRR_1$ is a 2-methyl-1-piperidyl radical.

6. An ester having the formula

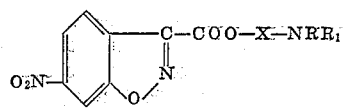

where X is a lower alkylene radical whose two free valence bonds are on different carbon atoms and $NRR_1$ is a 1-piperidyl radical.

7. A process of preparing a compound having the formula

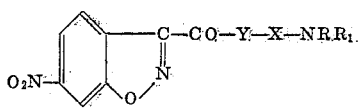

where Y is a member of the group consisting of O and NH, X is a lower alkylene radical whose two free valence bonds are on different carbon atoms and $NRR_1$ is a tertiary-amino radical selected from the group consisting of lower dialkylamino, 1-piperidyl, (lower alkylated)-1-piperidyl, 1-pyrrolidyl, (lower alkylated)-1-pyrrolidyl and 4-morpholinyl, which comprises reacting a lower alkyl 6-nitrobenzisoxazole-3-carboxylate with a compound having the formula $H-Y-X-NRR_1$.

8. A process of preparing an ester having the formula

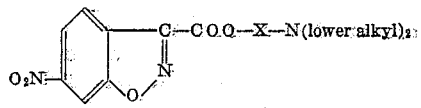

where X is a lower alkylene radical whose two free valence bonds are on different carbon atoms, which comprises reacting methyl 6-nitrobenzisoxazole-3-carboxylate with a dialkylaminoalkanol having the formula $HO-X-N(lower\ alkyl)_2$.

9. A process of preparing an ester having the formula

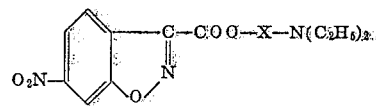

where X is a lower alkylene radical whose two free valence bonds are on different carbon atoms, which comprises reacting methyl 6-nitrobenzisoxazole-3-carboxylate with a diethylaminoalkanol having the formula $HO-X-N(C_2H_5)_2$.

10. A process of preparing an ester having the formula

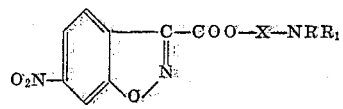

where X is a lower alkylene radical whose two free valence bonds are on different carbon atoms and $NRR_1$ is a (lower alkylated)-1-piperidyl radical, which comprises reacting methyl 6-nitrobenzisoxazole-3-carboxylate with a tertiary-aminoalkanol having the formula $HO-X-NRR_1$.

11. A process of preparing an ester having the formula

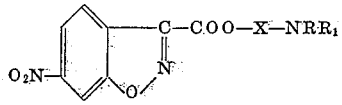

where X is a lower alkylene radical whose two free valence bonds are on different carbon atoms and $NRR_1$ is a 2-methyl-1-piperidyl radical, which comprises reacting methyl 6-nitrobenzisoxazole-3-carboxylate with a tertiary-aminoalkanol having the formula $HO-X-NRR_1$.

12. A process of preparing a compound having the formula

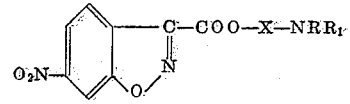

where X is a lower alkylene radical whose two free valence bonds are on different carbon atoms and $NRR_1$ is a 1-piperidyl radical, which comprises reacting methyl 6-nitrobenzisoxazole-3-carboxylate with a tertiary-aminoalkanol having the formula $HO-X-NRR_1$.

13. 2-diethylaminoethyl 6-nitrobenzisoxazole-3-carboxylate.

14. 3-diethylaminopropyl 6-nitrobenzisoxazole-3-carboxylate.

15. 2-(1-piperidyl)ethyl 6-nitrobenzisoxazole-3-carboxylate.

16. 3-(1-piperidyl)propyl 6-nitrobenzisoxazole-3-carboxylate.

17. 2-(2-methyl-1-piperidyl)ethyl 6-nitrobenzisoxazole-3-carboxylate.

18. A process of preparing 2-diethylaminoethyl 6-nitrobenzisoxazole-3-carboxylate which comprises reacting methyl 6-nitrobenzisoxazole-3-carboxylate with 2-diethylaminoethanol.

19. A process of preparing 3-diethylaminopropyl 6-nitrobenzisoxazole-3-carboxylate which comprises reacting methyl 6-nitrobenzisoxazole-3-carboxylate with 3-diethylaminopropanol.

20. A process of preparing 2-(1-piperidyl)ethyl 6-nitrobenzisoxazole-3-carboxylate which comprises reacting methyl 6-nitrobenzisoxazole-3-carboxylate with 2-(1-piperidyl)ethanol.

21. A process of preparing 3-(1-piperidyl)-propyl 6-nitrobenzisoxazole-3-carboxylate which comprises reacting methyl 6-nitrobenzisoxazole-3-carboxylate with 3-(1-piperidyl)propanol.

22. A process of preparing 2-(2-methyl-1-piperidyl)ethyl 6-nitrobenzisoxazole-3-carboxylate which comprises reacting methyl 6-nitrobenzisoxazole-3-carboxylate with 2-(2-methyl-1-piperidyl)ethanol.

RAYMOND O. CLINTON.
STANLEY C. LASKOWSKI.

No references cited.